United States Patent
Pittinger

[19]

[11] 3,877,146

[45] Apr. 15, 1975

[54] ROTATING BLADE HOLDER

[75] Inventor: Charles B. Pittinger, Woodland Hills, Calif.

[73] Assignee: Allegretti & Company, Chatsworth, Calif.

[22] Filed: Nov. 28, 1973

[21] Appl. No.: 419,597

[52] U.S. Cl. ................ 30/276; 30/264; 30/347; 30/DIG. 5; 30/DIG. 6; 56/17.5; 56/295
[51] Int. Cl. ............... B26b 7/00; B26b 15/00
[58] Field of Search ........ 30/276, 264, 347, DIG. 5, 30/ DIG. 6; 56/295, 17.5

[56] References Cited
UNITED STATES PATENTS

| 2,795,916 | 6/1957  | Miller ........................ 56/295 X |
| 2,854,807 | 10/1958 | Byler et al. ................. 56/295 |
| 2,870,616 | 1/1959  | Benson ...................... 56/295 X |
| 2,872,732 | 2/1959  | Arrowood ................... 30/DIG. 5 |
| 2,889,677 | 6/1959  | Wood ........................ 56/295 |
| 2,976,666 | 3/1961  | Machovec ................... 56/295 |
| 3,753,341 | 8/1973  | Berg et al. .................. 56/295 X |
| 3,774,379 | 11/1973 | Mizobata et al. ............. 56/17.5 |

Primary Examiner—Al Lawrence Smith
Assistant Examiner—J. T. Zatarga
Attorney, Agent, or Firm—Fulwider Patton Rieber Lee & Utecht

[57] ABSTRACT

A single-piece, resilient holder for rotating blades, for use in such devices as rotary grass trimmers and the like, having a diametral slot across one end to receive a blade with a central hole for engaging a central stud on the holder, and having integrally formed, elastically deformable retaining fingers under which the opposite halves of the blade are inserted as the blade is rotated about the stud to reach a locking position. The undersides of the retaining fingers have raised portions to act as detents tending to prevent inadvertent removal of the blade, and a cotter pin may be inserted in the holder to totally prevent movement of the blade from the locking position.

5 Claims, 6 Drawing Figures

PATENTED APR 15 1975 3,877,146
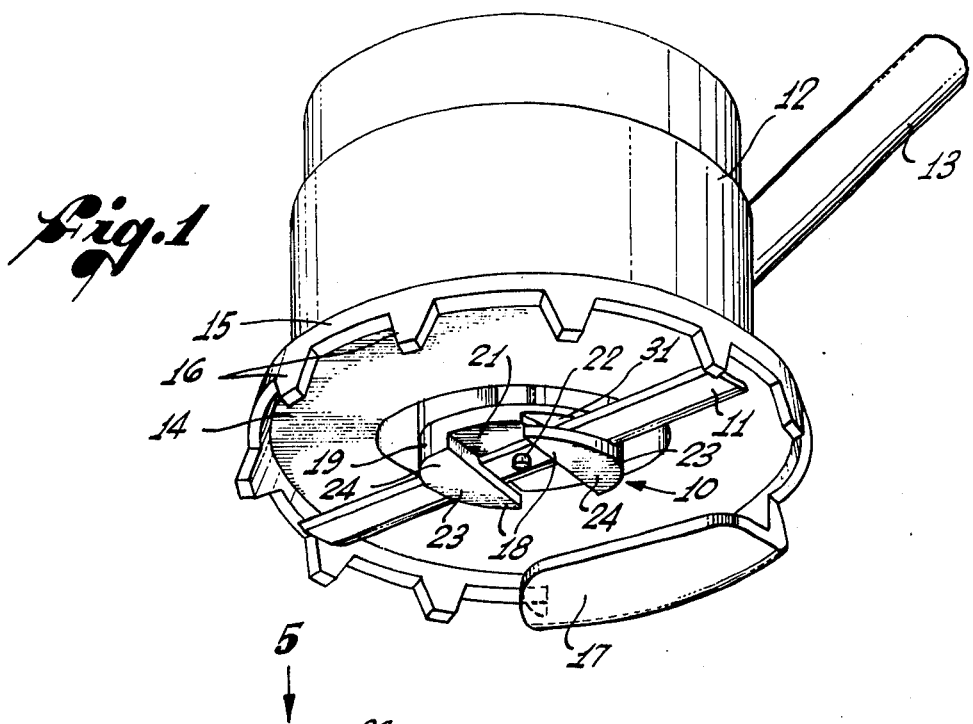
Fig. 1
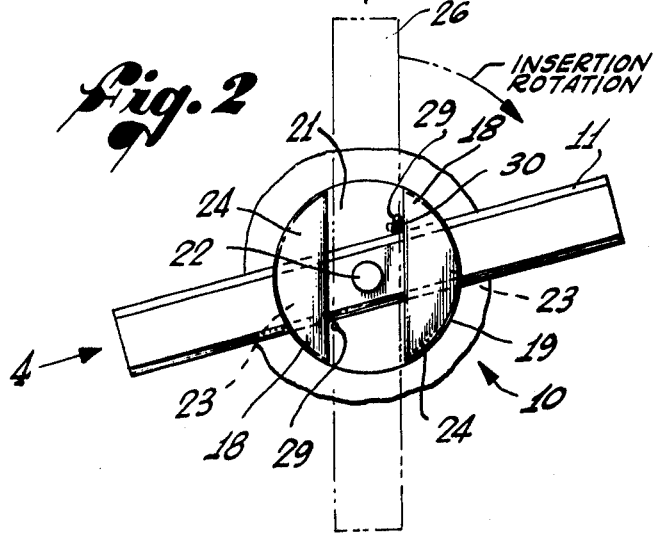
Fig. 2
Fig. 3
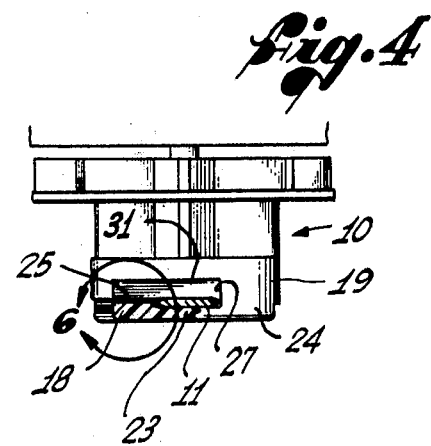
Fig. 4
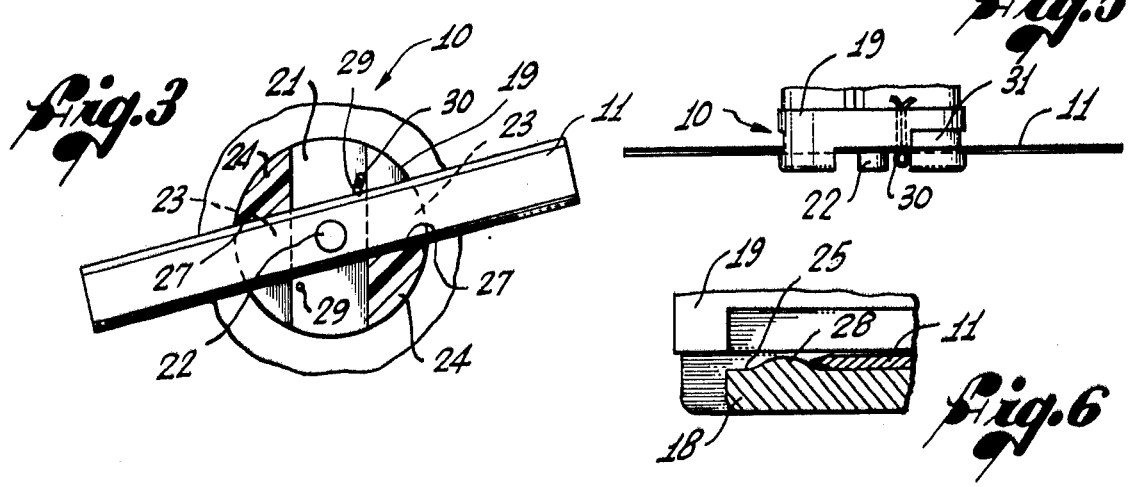
Fig. 5
Fig. 6

ROTATING BLADE HOLDER

BACKGROUND OF THE INVENTION

This invention relates to devices for holding blades for rotation in rotary grass trimmers, fans, and similar apparatus. More particularly, it relates to such devices in which radially extending blades are held securely during rotation but may be released and replaced if required.

Prior blade holders of this type generally include various blade securing and driving devices, such as retaining nuts and bolts, clutch mechanisms, and positive drive means. Removal and replacement of a blade in these prior holders requires disassembly and reassembly of the blade securing device, often a cumbersome and inconvenient process. Particularly in the case of rotary grass trimmers, the rotating blades are preferably resiliently secured to the holder, to absorb any impact with stones and other obstructions. In prior blade holders this resilience of mounting is effected by such means as compression springs and pressure plates, which further complicate removal and replacement of the blade.

SUMMARY OF THE INVENTION

The present invention resides in a single-piece blade holder in which the blade is securely held in a locking position by elastically deformable retaining portions, but may be quickly and easily released from the retaining portions by pivoting the blade about blade locating means on the holder. A replacement blade is just as quickly installed by engaging it with the blade locating means and rotating it to the locking position.

More specifically, the holder has a generally cylindrical body or hub, the blade locating means includes a pin or stud on one end of the holder engaging a generally central hole in the blade, and the elastically deformable portions are parallel fingers or projections formed on the end of the body of the holder and oppositely extending along the blade edges. As the blade is rotated to the locking position, the opposite halves of the blade slide under the retaining fingers until they abut shoulders formed where the fingers join with the body of the holder. The holder and blade are driven oppositely to the direction of rotation required to install the blade, and the torque required to turn the blade is transmitted through the aforementioned shoulders.

Each of the retaining fingers has a small convex portion on its underside which is of sufficient thickness to require slight deformation of the finger as the blade is rotated to or from the locking position. When the blade is in the locking position, the convex portions bear on the blade edges and act as detent means restraining the blade from inadvertent removal. In the preferred embodiment, a detent pin inserted in the holder body is also employed to prevent possible rotation of the blade from the locking position.

From the foregoing, it will be seen that the blade holder of the present invention embodies significant improvements over prior similar devices, particularly with respect to the speed and convenience of blade removal and insertion. Other aspects and advantages of the invention will become apparent from the following detailed description taken in conjunction with the accompanying drawings.

BRIEF DESCRIPTION OF THE DRAWINGS

FIG. 1 is a perspective view of the blade holder of the present invention holding a blade in a rotary grass trimmer;

FIG. 2 is a bottom view of the holder and blade of FIG. 1, showing the blade in the assembly position, in broken lines, and in the locking position, in solid lines;

FIG. 3 is a view similar to FIG. 2, showing the blade in the locking position and the holder partly in section;

FIG. 4 is an elevational view taken in the direction of the arrow 4 in FIG. 2, with the blade and retaining finger shown partly in section;

FIG. 5 is an elevational view taken in the direction of the arrow 5 in FIG. 2, with the blade in the locking position; and FIG. 6 is an enlarged fragmentary view taken within the arc 6 in FIG. 4 and illustrating the detent action of the retaining fingers.

DETAILED DESCRIPTION

As shown in the drawings for purposes of illustration, the invention is embodied in a blade holder, indicated generally by the reference numeral 10, for securely holding a blade 11 for rotation in a device such as a rotary grass trimmer. Although the blade holder 10 is described herein in terms relating to a grass trimmer or edger, it will be readily appreciated that the invention is equally well suited for holding fan blades, grinding disks or the like, or in any situation where a rotating drive mechanism is to be coupled to some device.

The rotary grass trimmer illustrated in FIG. 1 is of the type generally used to trim hard to reach lawn areas, such as corners and edges, and has an electric motor 12, and a handle 13 rigidly attached to it. The blade holder 10 projects from a hole in the lower end of the motor housing, is connected with the shaft of the motor 12, and holds the blade 11 for rotation in a plane perpendicular to the motor shaft. A generally circular shroud or blade guard 14 is attached to the lower end of the motor 12, above the plane of the blade 11, and has a peripheral skirt 15 with tooth-like portions 16 downwardly extending below the plane of the blade to prevent its touching the ground, but to admit grass to be cut by the rapidly rotating blade. Part of the skirt 15 bends inwardly beneath the plane of the blade 11 to form a skid 17 on which the trimmer may be supported and moved. In rotary grass trimmers of this general type, the blade 11 frequently strikes stones and other obstructions, and it is important that the blade mounting be relatively resilient, and that worn or damaged blades can be quickly and easily replaced.

In accordance with the present invention, the blade holder 10 holds the blade 11 with a pair of elastically deformable retaining fingers 18 formed integrally with the holder, and without the need for additional securing or locking elements.

More specifically, the blade holder 10 has a generally cylindrical lower end portion 19 across the end of which is a diametral slot 21 wider than the blade 11 and having substantial depth. At the center of the slot 21, i.e. at the axis of rotation of the holder 10, a stud 22 extends axially to approximately the top of the slot. The blade 11, which is a flat, elongated piece of metal with sharpened edges, has a central hole to engage the stud 22 and locate the blade in an assembly position in the slot 21, as shown at 26 in FIG. 2.

The slot 21 is bounded by two segment-shaped sections 23 which form the retaining fingers 18, as best illustrated in the elevational view of FIG. 4. The segment shaped sections 23 have fixed end portions 24 formed integrally with the holder and free end portions extending parallel to the slot 21 and in opposite directions to form the retaining fingers 18. The fingers 18 have surfaces 25 which are upwardly facing in the figures, and are spaced from the bottom of the slot 21 by approximately the thickness of the blade 11.

Thus, as the blade 11 is rotated from the assembly position 26, clockwise as shown in FIGS. 2 and 3, the opposite half sections of the blade slide under the retaining fingers 18 until they abut shoulders 27 formed where the retaining fingers join with the main body of the blade holder 10. This is the locking position illustrated in the drawings, and, in the embodiment shown, a blade rotation of approximately 75 degrees is required to reach this locking position from the assembly position. It will be apparent that, in the locking position, the holder 10 may be driven in a direction opposite to the direction of blade insertion, and the torque required to drive the blade will be transmitted through the shoulders 27, the blade 11 thus tending to remain in the locking position while the driving torque is applied.

It is an important aspect of the invention that the upwardly facing surface 25 of each of the retaining fingers 18 has a convex or raised area 28 (see FIG. 6) near the free end of each retaining finger. As the blade 11 is turned to the locking position, a slight torque must be applied to force it under the raised areas 28 by slightly deforming the retaining fingers 18. Then, when the blade 11 has reached the locking position, each raised area 28 bears against one edge of the blade and acts as a detent mechanism tending to prevent inadvertant unlocking and release of the blade. In the preferred embodiment, the end portion 19 of the holder 10 is provided with two holes 29 extending through its length and located adjacent the blade 11 in the locking position to receive cotter pins, one of which is shown at 30, which also act to prevent removal of the blade.

The entire blade holder 10 is preferably molded as a single piece of hard, yet resiliently deformable plastic material. A thermoplastic polycarbonate resin material, such as LEXAN (General Electric Co., Schenectady, New York) has been satisfactorily employed in the embodiment illustrated herein. Although the blade 11 is securely held by the holder 10, it can be resiliently bent downward to some degree against the deformable retaining fingers 18. Upward bending of the blade 11 is rendered somewhat easier by the presence of slots 31, rather than solid molded material, above each of the retaining fingers 18.

It will be apparent from the foregoing that the single-piece blade holder 10 of the present invention constitutes a significant advance over previously available holders for rotating blades. The holder retains the blade securely but resiliently, without the need for additional securing or locking elements, yet permits quick and convenient removal and replacement of the blade. It will also be apparent that, while a particular embodiment of the invention has been described in detail for purposes of illustration, various changes and modifications may be made without departing from the spirit and scope of the invention.

I claim:

1. A holder for releasably securing a blade to rotational drive means, comprising:
    a holder body connectable to the rotational drive means and having a generally flat end face for holding the blade;
    a central stud projecting axially from said end face to engage a central hole in the blade;
    a pair of resiliently deformable retaining fingers formed integrally with said holder body, oppositely extending across said flat end face in parallel relation with each other and with said end face, and spaced equidistantly from said central stud to form a recess for receiving the blade in an assembly position;
    a convex rib under each of said retaining fingers, sized to bear against the blade and thereby bend said retaining fingers on rotation of the blade from the assembly position to a locking position with opposite halves of the blade under said retaining fingers, and to act as a detent to restrain the blade from inadvertent movement from the locking position; and
    a shoulder formed where each of said fingers joins with said flat end face, said shoulder preventing further movement of the blade beyond the locking position and acting to transmit driving torque to the blade.

2. A holder as set forth in claim 1, further including a detent pin fitted through a hole in said flat end face, the hole being located adjacent the blade to prevent movement from the locking position.

3. A holder as set forth in claim 1, wherein said holder is a single-piece molding of a thermoplastic material.

4. A blade and blade holder combination for use in a rotary grass trimmer, comprising:
    a flat elongated metal blade having a central hole therethrough and sharpened edges; and
    a single-piece hub having a generally flat end face, a central stud for engaging said hole, and a pair of resiliently deformable retaining fingers, oppositely extending across said flat end face to secure said blade in a locking position against said flat end face on rotation of said blade about said central hub;
    said retaining fingers having raised detent buttons on their undersides to bear against said blade and restrain it from inadvertent removal from said hub, and having shoulders formed where said fingers join with said flat end face, to prevent rotation of said blade beyond the locking position and to transmit driving torque to said blade.

5. A combination as set forth in claim 4, further including at least one detent pin fitted in a hole through said hub adjacent said blade to prevent movement from the locking position.

* * * * *